Patented Aug. 20, 1946

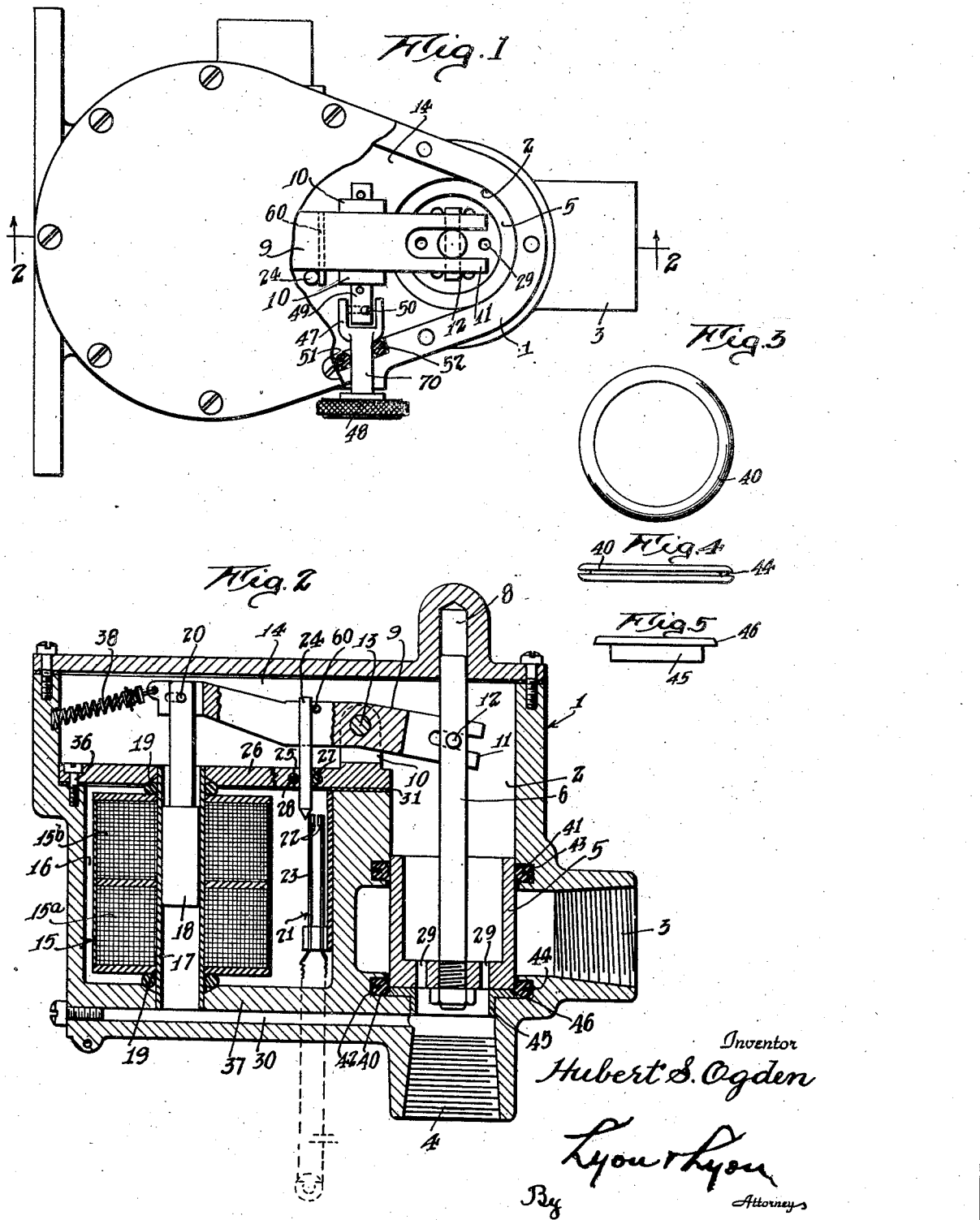

2,406,246

UNITED STATES PATENT OFFICE 2,406,246

VALVE

Hubert S. Ogden, Los Angeles, Calif.

Application March 27, 1944, Serial No. 528,237

9 Claims. (Cl. 200—53)

My invention relates to a valve, and more specifically to a two-way flow valve for use in the gasoline control system of an airplane.

A valve for use in a gasoline controlled system for airplanes, must be leakproof and operable not only by an electric solenoid, which must be sealed from exposure to the gasoline passing through the valve, but operable by hand in case of an emergency. It must also have means connected to it for electrically indicating the position of the valve.

A valve constructed in accordance with my invention is entirely sealed, so that there is no danger of leaks, which would cause a fire hazard. It is operable by a solenoid that does not stick or jam. It also will not vibrate open or shut and remains in the position to which it is placed, and has electrical means for indicating the position of the valve to the pilot of the plane.

Other objects and advantages of my invention will be apparent from the following description of the preferred embodiment thereof.

In the drawing:

Fig. 1 is a plan view, partially in section.

Fig. 2 is a cross section.

Figs. 3, 4 and 5 are plan views of parts.

The valve constructed in accordance with my invention, comprises an outer case 1 which has in it a chamber 2 with ports 3 and 4 connecting therewith. Slidably mounted in the chamber 2 is a piston 5 having a piston rod 6. I prefer to have guide means constituting the bore 8 in which the piston rod 6 slides to prevent any twisting or lateral movement of the piston 5. To operate the piston 5 a lever 9 is pivoted on a boss 10 and has a clevis 11 which fits over a pin 12 connecting the same with the piston rod 6. The lever 9 extends from the pivot 13 into the chamber 2 and is connected to the piston rod 6. On the other side of the pivot 13 it extends into a chamber 14 which opens into the chamber 2, and a solenoid coil 15 is mounted in a chamber 16. An iron plunger 18 is slidably carried in the sleeve 17 of the solenoid 15, and is pivotally connected to the lever 9 at 20. To cause the operation of my valve to be positive and to prevent friction and resistance, the pivot 13 is at the exact center of gravity of the arm 9 and the pistons and connecting rods attached thereto.

When an electrical current is passed through the coil 15a, it will draw the plunger 18 downwardly in the sleeve 17 and will move the arm 9 on its pivot 13 so as to raise the piston 5, which will permit gasoline to flow through the port 3 into the chamber 2 and out through the port 4, or in the reverse direction. Energizing the coil 15b will cause the reverse movement of the plunger 18 and cause the piston 5 to close the ports 3 and 4.

To indicate the position, either open or shut, of the piston 5, I provide the electrical switch 21 in the chamber 16. When the points 22 of this switch are in contact with each other, a flow of electricity is permitted through the spring arms 23 and they are connected to an electric light bulb on the control board of the plane which indicates whether or not the valve is open or closed.

To cause the contacts 22 to touch and complete the electrical circuit, a rod 24 extends through a hole 25 in a plate 26, and is mounted in position by a rubber doughnut 27 in the recess 28. This doughnut 27 is sufficiently tight to prevent the rod 24 from sliding longitudinally in the hole 25, and also prevents any leak of gasoline from the chamber 14. A pin 60 extends from the arm 9 and contacts the rod 24, and when the valve is opened, the arm 9 descends on the left side of the pivot 13 causing the pin 60 to move in an arc of a circle around the pivot 13, causing the rod 24 to pivot so that its lower end forces the contacts 22 into engagement. Closing of the valve relieves the pressure of the pin 60 on the rod 24, and the spring arms 23 return the rod 24 to its original position, breaking the contact 22.

In order to permit the piston 5 to move without any pressure thereon, I provide a complete circulation around it. The ports 29 in the piston 5 permit the flow into the chambers 2 and 14 of any fluid below the valve. The passage 30 connects with the lower end of the sleeve 17 and thus places equal fluid pressure on both sides of the iron plunger 18. By thus porting the fluids to all sides of the piston 5 and the plunger 18, the pressures are equalized and cannot disturb the positions thereof nor effect their operation.

I seal off the chamber 16 in which is carried the solenoid 15 and the electric switch 21 from any of the fluid containing chambers, by the plate 26 with its fluid-tight gasket 31. The sleeve 17 is a tight fit in the plate 26 and the wall 37, but to increase the safety factor and prevent any possible leak into the chamber 16, rubber doughnuts 19 are positioned around the sleeve 17 between the solenoid coil 15 and the plate 26 and the wall 37. When the machine screws 36 are tightened, the plate 26 is drawn down squeezing the rubber doughnuts 19 tightly between the solenoid 15 and the plate 26 and the wall 37.

Though it is not necessary to the actual operation of my valve, I have provided the compression spring 38 to place a slight tension on the arm 9 to prevent vibration from moving the same. However, this spring 38 is only a safety precaution as the pressures on both sides of the piston 5 and the plunger 18 being equal, vibration will not cause them to move even with the spring left off.

A novel feature of my invention is the shape and position of the piston rings 40 and 41 which seal the piston 5 and prevent leakage between the ports 3 and 4. The piston rings 40 and 41 are placed in recesses 42 and 43 respectively. By so positioning, the rings are not moved across the edges of the port 3 as would be the case if they were attached to the piston 5. This prevents wear from the sharp edges of the port. I have found that the efficiency of the piston rings 40 and 41 can be increased and their operation more satisfactory by making them in the form shown specifically in Fig. 4. The rings 40 and 41 are constructed of a rubber or synthetic doughnut with the groove 44 cut or molded all the way around. I have found that solid rubber or synthetic doughnuts are contracted or expanded by the fluids passing through the valve. This causes the same to bind to the piston or become so loose that they do not seal. By placing the groove 44 on the doughnut a tight fitting piston ring can be used which substantially fills the recesses 42 and 43, but which can expand or contract without either sticking the valve or causing a leak. The groove 44 does not change the external shape of the doughnut and thus always fits tight, but any pressure causes the same to compress upon itself thus allowing the doughnut to absorb any pressure without fatal distortion or sticking.

I have found that in valves as described above, that when fluid is flowing from the port 3 to port 4 and the valve is closed by pressing the piston 5 down upon the piston ring 40 at the instance before closing, the flow of liquid has such force that it tends to roll the ring 40 from the recess 42 into a position under the lower face of the piston 5, thus preventing the closing of the valve. To overcome this difficulty I provide a grommet 45 which has the sloping side 46 which prevents the ring 40 from rolling.

As the electrical system of a plane may fail and it is desirable to operate my valve manually, I have provided the rod 70 which is rotatably journaled in the case 1 and has a loose fitting clevis 47 which can be turned by rotating the hand wheel 48 to engage the pin 50 on the shaft 49. The shaft 49 is a press fit in the arm 9 and is rotatably mounted in the pivot 13. Rotation of the shaft 49 rocks the arm 9 and either closes or opens the valve. To prevent any friction, the clevis 47 is made large enough that the normal solenoid operation does not cause the pin 50 to contact the clevis 47. The clevis only contacts and rotates the pin when the hand wheel is given a sizable turn. The rod 70 has a rubber or synthetic doughnut 51 surrounding it and fitting into the recess 52 to prevent leakage.

While I have described the preferred embodiments of my invention, I am not to be limited to any of the details set forth herein, except as defined in the appended claims.

I claim:

1. In a valve, a case forming a chamber, ports entering said chamber, a piston for closing said ports, a rocker arm connected at one end to said piston and connected at the other end to a plunger of a solenoid, said piston having ports to equalize the pressure on both sides, and a passage in said case to equalize the pressure on both sides of the plunger of said solenoid, recesses in said case, resilient piston rings having a circular cross-section inserted in said recesses and adapted to seal said ports when said piston is in closed position, said piston rings having a groove in their outer faces.

2. In a valve, a case forming a chamber, ports entering said chamber, a piston for closing said ports, a rocker arm connected at one end to said piston and connected at the other end to a plunger of a solenoid, said piston having ports to equalize the pressure on both sides, and a passage in said case to equalize the pressure on both sides of the plunger of said solenoid, an electrical switch positioned exterior of the chamber to indicate the position of said piston, a rod pivotally mounted in the sealing means of said case to actuate said switch, a pin on said rocker arm to move said rod, recesses in said case, resilient piston rings inserted in said recesses and adapted to seal said ports when said piston is in closed position, said piston rings having a groove in their outer faces.

3. In a valve, a case forming a chamber, ports entering said chamber, a piston for closing said ports, a rocker arm connected at one end to said piston and connected at the other end to a plunger of a solenoid, said piston having ports to equalize the pressure on both sides, said rocker arm being pivoted at the center of gravity of the rocker arm, piston and solenoid system, and a passage in said case to equalize the pressure on both sides of the plunger of said solenoid, an electrical switch positioned exterior of the chamber to indicate the position of said piston, a rod pivotally mounted in the sealing means of said case to actuate said switch, a pin on said rocker arm to move said rod, recesses in said case, resilient piston rings inserted in said recesses and adapted to seal said ports when said piston is in closed position, said piston rings having a groove in their outer faces.

4. In a valve, a case forming a chamber, ports entering said chamber, a piston for closing said ports, a rocker arm connected at one end to said piston and connected at the other end to a plunger of a solenoid, said piston having ports to equalize the pressure on both sides, and a passage in said case to equalize the pressure on both sides of the plunger of said solenoid, an electrical switch positioned exterior of the chamber to indicate the position of said piston, a rod pivotally mounted in the sealing means of said case to actuate said switch, a pin on said rocker arm to move said rod, a pivot for said rocker arm comprising a shaft carrying a pin, a rod passing through said case to the exterior, a clevis on said rod to engage said pin when said rod is rotated to manually move said rocker arm, recesses in said case, resilient piston rings inserted in said recesses and adapted to seal said ports when said piston is in closed position, said piston rings having a groove in their outer faces.

5. In a valve, a case forming a chamber, ports entering said chamber, a piston for closing said ports, a rocker arm connected at one end to said piston and connected at the other end to a plunger of a solenoid, said piston having ports to equalize the pressure on both sides, and a passage in said case to equalize the pressure on both sides of the plunger of said solenoid, a pivot for said rocker arm comprising a shaft carrying a pin, a rod passing through said case to the exterior, a clevis on said rod to engage said pin when said rod is rotated to manually move said rocker arm, recesses in said case, resilient piston rings having a circular cross-section inserted in said recesses and adapted to seal said ports when said piston is in closed position, said piston rings having a groove in their outer faces.

6. In a valve, a case forming a chamber, ports entering said chamber, a piston for closing said ports, a rocker arm connected at one end to said piston and connected at the other end to a plunger of a solenoid, said piston having ports to equalize the pressure on both sides, and a passage in said case to equalize the pressure on both sides of the plunger of said solenoid, a pivot for said rocker arm comprising a shaft carrying a pin, a rod passing through said case to the exterior, a clevis on said rod to engage said pin when said rod is rotated to manually move said rocker arm, recesses in said case, resilient piston rings having a circular cross-section inserted in said recesses and adapted to seal said ports when said piston is in closed position, said piston rings having a groove in their outer faces, one of said piston rings being positioned as the seat for said piston adjacent to one of said ports, a grommet surrounding said port and having an upwardly sloping face to prevent the adjacent piston ring from moving from its recess.

7. In a valve, a case forming a chamber, ports entering said chamber, a piston for closing said ports, a rocker arm connected at one end to said piston and connected at the other end to a plunger of a solenoid, said piston having ports to equalize the pressure on both sides, and a passage in said case, to equalize the pressure on both sides of the plunger of said solenoid, an electrical switch positioned exterior of the chamber to indicate the position of said piston, a rod pivotally mounted in the sealing means of said case to actuate said switch, a pin on said rocker arm to move said rod, a pivot for said rocker arm comprising a shaft carrying a pin, a rod passing through said case to the exterior, a clevis on said rod to engage said pin when said rod is rotated to manually move said rocker arm, recesses in said case, resilient piston rings inserted in said recesses and adapted to seal said ports when said piston is in closed position, said piston rings having a groove in their outer faces, one of said piston rings being positioned as the seat for said piston adjacent to one of said ports, a grommet surrounding said port and having an upwardly sloping face to prevent the adjacent piston ring from moving from its recess.

8. In a valve, a case forming a chamber, ports entering said chamber, a piston for closing said ports, a rocker arm connected at one end to said piston and connected at the other end to a plunger of a solenoid, said piston having ports to equalize the pressure on both sides, and a passage in said case to equalize the pressure on both sides of the plunger of said solenoid, an electrical switch positioned exterior of the chamber to indicate the position of said piston, a rod pivotally mounted in the sealing means of said case to actuate said switch, a pin on said rocker arm to move said rod, recesses in said case, resilient piston rings inserted in said recesses and adapted to seal said ports when said piston is in closed position, said piston rings having a groove in their outer faces, one of said piston rings being positioned as the seat for said piston adjacent to one of said ports, a grommet surrounding said ports and having an upwardly sloping face to prevent the adjacent piston ring from moving from its recess.

9. In a valve, a case forming a chamber, ports entering said chamber, a piston for closing said ports surrounded by a resilient piston ring and adapted to seal said ports when said piston is in closed position, a rocker arm connected at one end to said piston and connected at the other end to the plunger of a solenoid, said piston having ports to equalize the pressure on both sides and a passage in said case to equalize the pressure on both sides of the plunger of said solenoid.

HUBERT S. OGDEN.